(12) United States Patent
Yates et al.

(10) Patent No.: US 12,729,644 B2
(45) Date of Patent: Sep. 8, 2026

(54) GAS TURBINE ENGINE

(71) Applicant: Rolls-Royce plc, London (GB)

(72) Inventors: Martin K. Yates, Derby (GB); Michael C. Willmot, Sheffield (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/916,845

(22) Filed: Oct. 16, 2024

(65) Prior Publication Data

US 2025/0250929 A1 Aug. 7, 2025

(30) Foreign Application Priority Data

Nov. 3, 2023 (GB) ..................................... 2316850

(51) Int. Cl.

*F02C 3/22* (2006.01)
*F02C 7/224* (2006.01)
*F02C 7/232* (2006.01)
*F02C 7/236* (2006.01)

(52) U.S. Cl.

CPC ................ *F02C 3/22* (2013.01); *F02C 7/224* (2013.01); *F02C 7/232* (2013.01); *F02C 7/236* (2013.01); *F05D 2220/323* (2013.01)

(58) Field of Classification Search

CPC .. F02C 3/22; F02C 7/224; F02C 7/232; F02C 7/236; F02K 9/46; F02K 9/50
See application file for complete search history.

(56) References Cited

U.S. PATENT DOCUMENTS 10,415,507 B2 * 9/2019 Hue .......................... F02K 9/46
10,443,503 B2 * 10/2019 Alecu ..................... F02C 7/236
2015/0028039 A1 * 1/2015 Kircher .................. B60K 15/03 220/592.27
2015/0321767 A1 11/2015 Kamath et al.
2022/0145801 A1 * 5/2022 McCurdy Gibson ..... F02C 3/22
2022/0178306 A1 * 6/2022 Durand ..................... F02C 7/22

FOREIGN PATENT DOCUMENTS

EP 3978738 A1 4/2022
FR 3110936 A1 12/2021
GB 869274 A 5/1961
WO 2022263307 A1 12/2022

OTHER PUBLICATIONS

European search report dated Feb. 20, 2025, issued in EP Patent Application No. 24204406.3.
Great Britain search report dated Apr. 17, 2024, issued in GB Patent Application No. 2316850.3.

* cited by examiner

*Primary Examiner* — Kyle Robert Thomas

(57) ABSTRACT

A fuel system for a hydrogen fuelled gas turbine engine comprises a tank configured to store hydrogen, a pump configured to provide pressurised hydrogen at an outlet thereof, and a pre-heater configured to heat at least a portion of pressurised hydrogen fuel downstream of the pump. A preheater return offtake is configured to return at least a portion of hydrogen fuel heated by the preheater to the tank.

13 Claims, 4 Drawing Sheets

GAS TURBINE ENGINE

This specification is based upon and claims the benefit of priority from United Kingdom patent application number GB 2316850.3 filed on Nov. 3, 2023, the entire contents of which is incorporated herein by reference.

BACKGROUND

Technical Field

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures, as either a compressed gas, a supercritical fluid, or a liquid. Such fuel requires heating prior to delivery to the gas turbine, both to permit combustion, and to prevent icing. As such, the applicant has filed patent application EP 3978738 directed to a fuel system for a hydrogen powered gas turbine engine.

Description of the Related Art

However, pumping fuel within such systems, particularly where the hydrogen is supplied as a liquid, is challenging. These challenges include the high power required to pump the hydrogen at the necessary flow rates and pressures, and the risk of cavitation within the pump where the pump operates on liquid hydrogen.

SUMMARY

The invention is directed towards a fuel system for a hydrogen fuelled gas turbine engine comprising:

- a tank configured to store hydrogen;
- a pump configured to provide pressurised hydrogen at an outlet thereof;
- a pre-heater configured to heat at least a portion of pressurised hydrogen fuel downstream of the pump; and
- a preheater return offtake configured to return at least a portion of hydrogen fuel heated by the preheater to the tank.

Advantageously, pressure within the liquid hydrogen tank is maintained during operation by heated and pressurised hydrogen from the pump and pre-heater, thereby maintaining positive tank pressure during depletion, and reducing pump pressure head.

The hydrogen tank may be configured to store cooled compressed hydrogen as a supercritical fluid at a pressure between 50 and 350 Bar. Advantageously, a higher proportion of hydrogen stored in the tank can be obtained for the gas turbine engine, since high tank pressure is maintained throughout operation.

Alternatively, the hydrogen tank may be configured to store liquid hydrogen. The hydrogen tank may be configured to store liquid hydrogen at a pressure of between 1 and 4 Bar.

The fuel system may comprise a valve and a controller operable to control flow through the offtake to the tank. The controller may be configured to maintain pressure within the tank above a saturation pressure. Advantageously, pump cavitation is avoided, since the pressure within the liquid hydrogen tank can be maintained above a saturation pressure at the pump inlet.

The fuel system may comprise a pump return offtake configured to divert a portion of fuel from an outlet of the pump to the tank.

The fuel system may comprise a mixer configured to mix flow from the preheater return offtake and pump return offtake prior to return of the mixed flow to the tank. Advantageously, the temperature, pressure and phase of the hydrogen returned to the tank can be controlled by controlling relative flows from the preheater and pump return offtakes.

The mixer may comprise an ejector, wherein flow from the preheater return offtake is configured to drive flow from the pump return offtake. Advantageously, the relatively low-pressure pump return offtake flow can be driven by the higher pressure preheater return offtake flow, to ensure that a sufficient volume of sufficiently high pressure, cold gaseous hydrogen is returned to the tank.

The fuel system may comprise a plurality of hydrogen pumps provided in series. The pump return offtake may be provided downstream of at least a first hydrogen pump outlet, and upstream of a further hydrogen pump inlet. Advantageously, the return line is not provided with the full pressure rise of the hydrogen pumping system, reducing the requirement for throttling, and reducing additional heat input to the hydrogen tank.

The preheater may comprise a burner configured to burn a portion of hydrogen fuel to produce heated hydrogen fuel.

In a second aspect, there is provided a method of delivering hydrogen fuel to a gas turbine engine in accordance with the first aspect, comprising:

- pumping hydrogen fuel from a tank through a main fuel conduit;
- heating hydrogen to provide a heated pressurised hydrogen gas; and
- returning a portion of the heated, pressurised hydrogen gas to the tank.

The method may comprise, by a controller, controlling a valve configured to control flow through the offtake to the tank, to maintain pressure within the tank above a saturation pressure.

BRIEF DESCRIPTION OF THE DRAWINGS

An embodiment will now be described by way of example only with reference to the accompanying drawings, which are purely schematic and not to scale, and in which.

DETAILED DESCRIPTION

Figure 1:
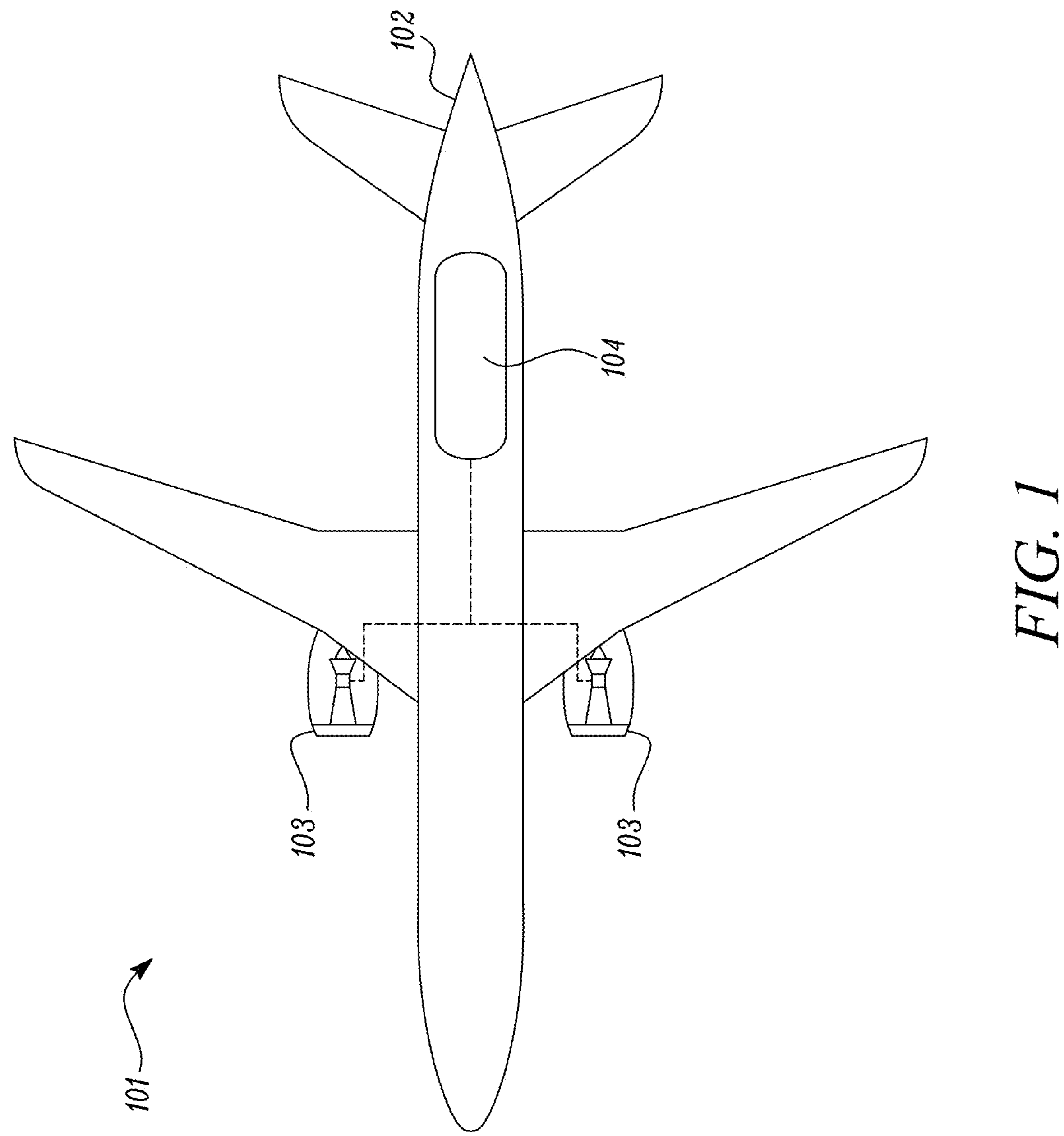
FIG. 1 shows a hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103.

A hydrogen storage tank 104 is located in the fuselage 102. In the present embodiment, the hydrogen storage tank 104 is a cryogenic hydrogen storage tank and thus stores the hydrogen fuel in a liquid state, for example between 20 and 26 kelvin, and in a specific example at 25 kelvin. In this example, the hydrogen fuel is pressurised to a pressure from around 1 bar to around 3 bar, in a specific example 2 bar.

Figure 2:
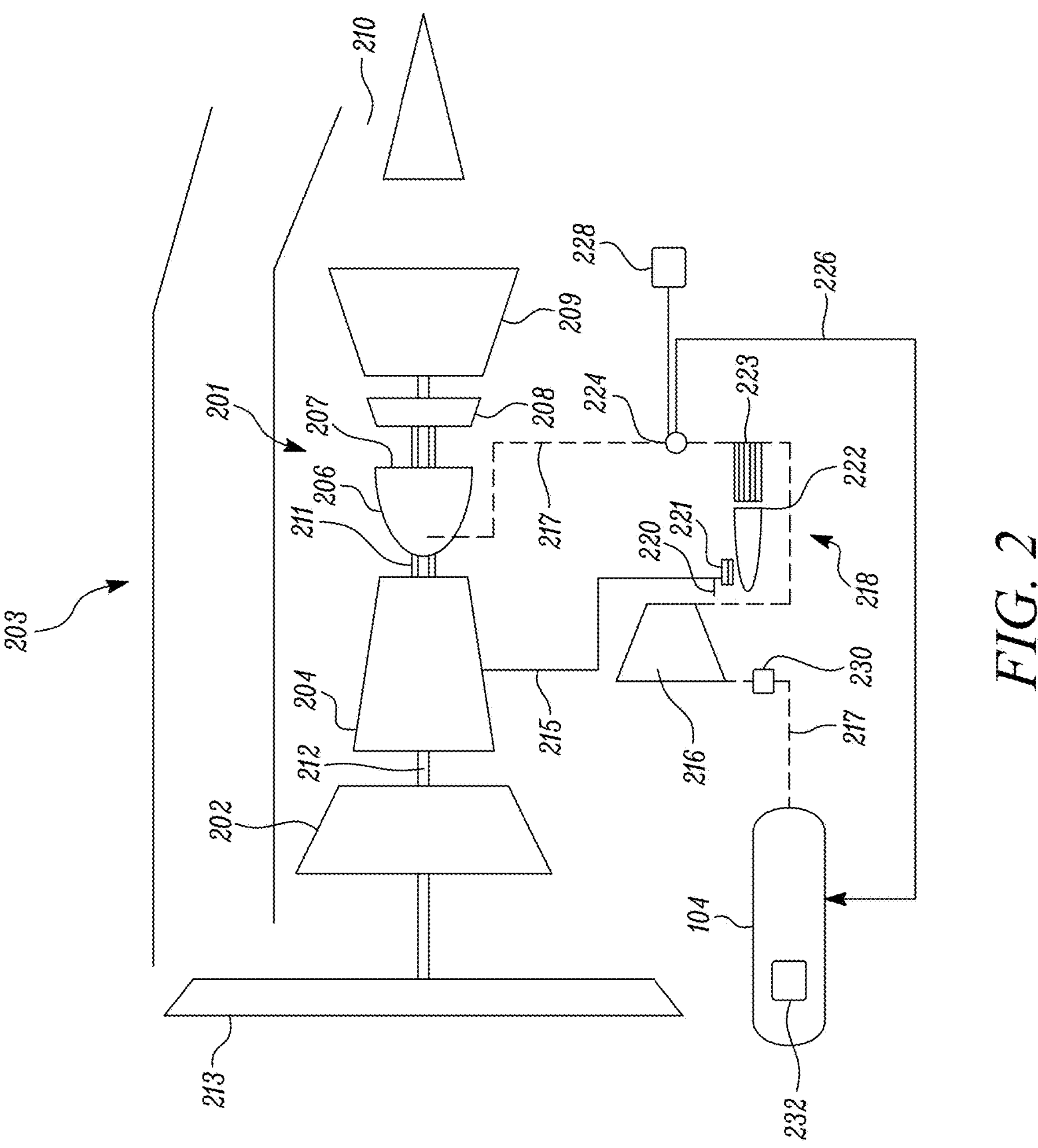
FIG. 2 is a block diagram of one of the engines of FIG. 1 including a fuel system.

A block diagram of one of the turbofan engines 103 is shown in FIG. 2, which shows a first fuel system for the engine 103.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

In operation, the low-pressure turbine 209 drives a fan 213 via shaft 212.

In operation, hydrogen fuel is pumped from the hydrogen storage tank 104 by a pump 216 and into a main fuel conduit 217 which ultimately delivers fuel to the fuel injection system 206. The pump may be driven by an electric machine or via one or more of the gas turbine engine core shafts 211, 212 via an auxiliary gearbox, or by a turbine powered by heated fuel, exhaust gases from the preheater, or compressed air from the core compressor. The pump provides a "head" of pressure, raising the pressure from the inlet (defined by the pressure conditions upstream of the pump, in particular tank pressure), to a higher pressure at an outlet.

As will be appreciated, it is desirable to also increase the temperature of the fuel from the 25 kelvin cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 kelvin.

In the present embodiment, a preheater 218 is therefore provided for heating of the hydrogen fuel, and possibly to implement a phase change where the hydrogen is stored as a liquid. In the present embodiment, this takes place between the pump 216 and the fuel injection system 206. In an embodiment, the preheater 218 is configured to raise the temperature of the hydrogen fuel to the required injection temperature.

The pre-heater 218 comprises a burner offtake 220 to divert a portion of the hydrogen fuel from the main fuel conduit 217. The amount of hydrogen bled from the main fuel conduit 217 is controlled by a valve (not shown). In an embodiment, the valve is controlled actively, for example in response to the temperature of the fuel at the fuel injection system 206. Alternatively, the valve may be passively controlled. In operation, of the order of around 1 percent of the hydrogen fuel flow through the main fuel conduit 217 is bled for use in the heater 218. The pre-heater 218 comprises a burner 222 in which hydrogen is combined with air from a compressed air source such as a compressor bleed 215 and combusted. Combustion gases pass through a heat exchanger 223, where the hot exhaust gases warm the hydrogen in the main hydrogen fuel conduit 217.

As will be appreciated, as the tank is drained in operation, the pressure of hydrogen within the tank may steadily reduce. It is important to maintain a positive pressure within the tank relative to external pressure, in order to maintain structural integrity of the tank, to assist in pumping further hydrogen from the tank, and to prevent cavitation of downstream turbomachinery. Such pressure control may be difficult in view of the varying external pressure as the aircraft climbs and descends. Additionally, the hydrogen may increase in temperature during storage. In view of both the increased pressure and temperature, there is a risk that supercritical or gaseous hydrogen bubbles may form within the hydrogen fuel conduit 217 upstream of the pump. Such bubbles may also be formed or increased in volume due to the low pressure caused by suction from the pump 216. Bubbles within the hydrogen fuel may result in cavitation within the pump 216, which may result in bearing damage (due to unbalanced impeller forces) and damage to the impeller itself, thereby reducing pump life and increasing risk of failure. Finally, the pumping system relies on a minimum delivery pressure from the tank. A reduced delivery pressure will require greater pumping work, which necessitates large pumps, and possibly more pumping stages, which results in increased weight. Consequently, the present disclosure provides means for increasing or at least maintaining the pressure within the tank 104, and upstream of the pump 216 within the main fuel conduit 217.

Downstream of the pre-heater 218 in main hydrogen fuel flow is a pre-heater offtake return valve 224, which is configured to control flow from the main fuel conduit 217 to the injection system 206 and to a pre-heater return line 226. The return line 226 communicates between the offtake return valve 224 and the tank 104. Consequently, pressurised, heated hydrogen fuel diverted from the main fuel conduit 217 downstream of the pump and the pre-heater 218 can be provided back to the hydrogen tank 104 by operation of the pre-heater offtake return valve 224. As will be appreciated, fuel pressure within the return line 226 will be higher than tank pressure in view of operation of the pump 216 and pre-heater 218, such that hydrogen will flow toward the tank 104. Where the tank is configured to store liquid hydrogen, the return flow may be provided to an ullage space within the tank 104.

As such, the tank pressure and pump inlet pressure are both maintained at a relatively high level. In one example, the valve 224 is controlled by a controller 228 to ensure pressure at a pump 216 inlet is above a saturation pressure, such that bubbles do not form within the flow. Pressure and/or temperature pump sensors 230 may be provided, configured to sense pressure and/or temperature conditions at the pump inlet. In the event that conditions are present which are indicative of the fluid approaching the saturation pressure, the controller 228 may be configured to control the valve 224 to increase return flow to the tank 104. Additionally or alternatively, pressure and/or temperature tank sensors 232 may be provided to sense pressure and/or temperature conditions within the tank 104. The controller 228 may be configured to control the valve 224 to increase return flow in the event that conditions are non-optimal, e.g. if pressure within the tank 104 is too low. The system may take into account one or more pressure requirements. For example, a first pressure requirement may comprise a saturation pressure requirement. A second pressure requirement may comprise a pump inlet pressure requirement, i.e. a minimum pressure required at an inlet to the pump 216 to provide for operation. A third pressure requirement may comprise a tank structural integrity requirement, i.e. a minimum pressure required to prevent collapse or excess stress on the tank 104. The system may be configured to operate the valve 224 such that all three requirements are met.

Figure 3:
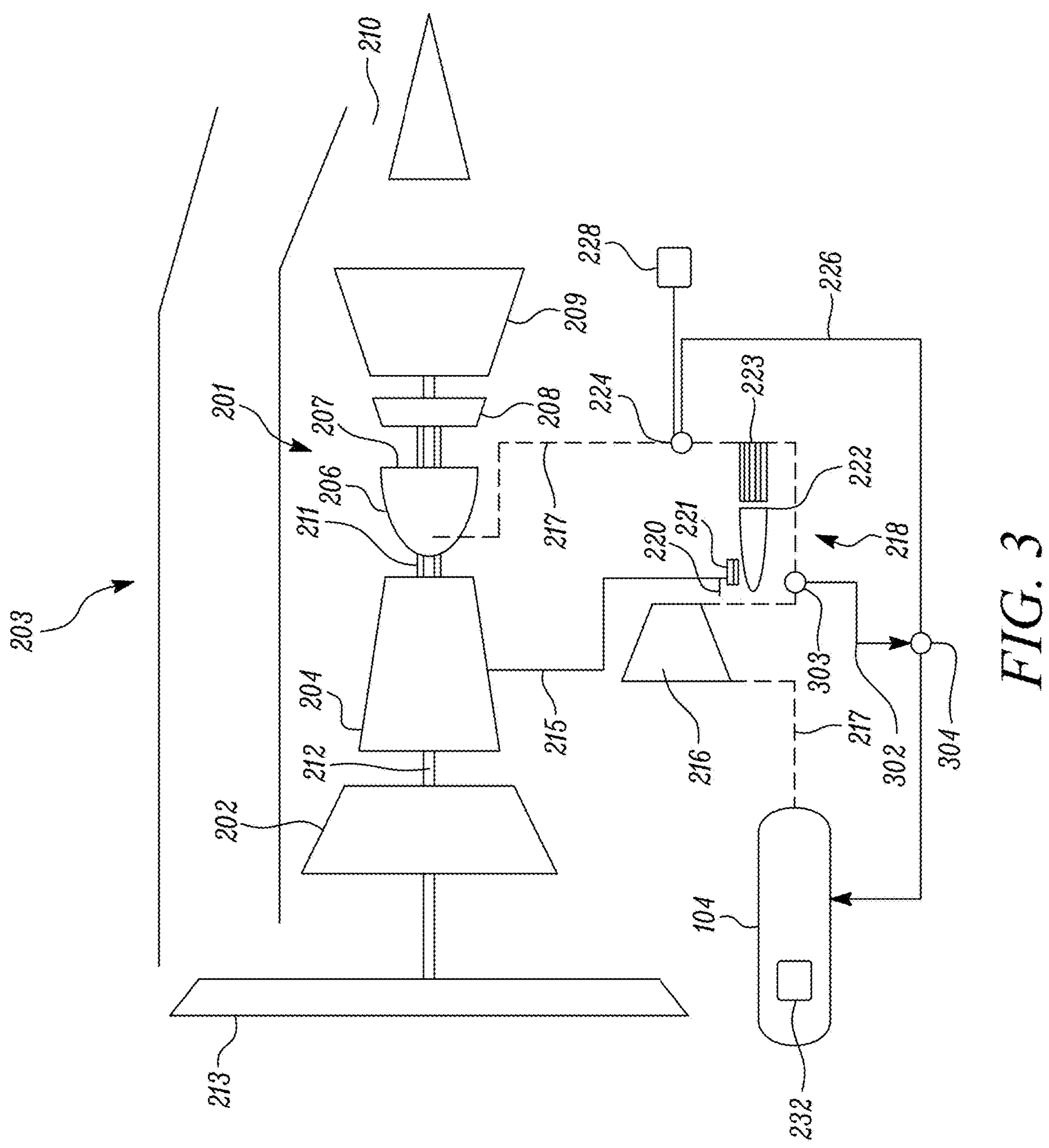
FIG. 3 is a block diagram of one of the engines of FIG. 1 including a first alternative fuel system.

FIG. 3 illustrates a first alternative fuel system for the engine 103. The system is similar to that shown in FIGS. 2, but additional features are provided.

The system of FIG. 3 includes a pump return offtake line 302. A first end of the pump return offtake line 302 is in fluid communication with an offtake located in the main hydrogen conduit 217 between an outlet of the pump 216 and an inlet of the pre-heater heat exchanger 223. A second end of the pump return offtake line 302 is in fluid communication with a mixer 304, which is in turn provided in fluid communication with the pre-heater return line 226, downstream of the offtake return valve in hydrogen fuel flow. Flow through the return line 302 is controlled by a valve 303. As such, the return lines 302, 226 bleed a portion of hydrogen fuel flow from the main conduit 217 from points between the pump 216 and the pre-heater heat exchanger 223, and downstream of the pre-heater heat exchanger respectively, and provide them to the mixer 304. Typically, the pump return offtake line 302 carries liquid hydrogen in operation, while the hydrogen in the pre-heater return line 226 from the valve 224 is in a gaseous or supercritical state.

The mixer 304 takes the two flows, which may be at different pressures, temperatures and phases, and combines them to provide a mixed flow back to the hydrogen tank 104. The mixer may operate as an ejector, with the higher energy flow from downstream of the heater entraining and pumping flow bled from the pump return line 302.

Figure 4:
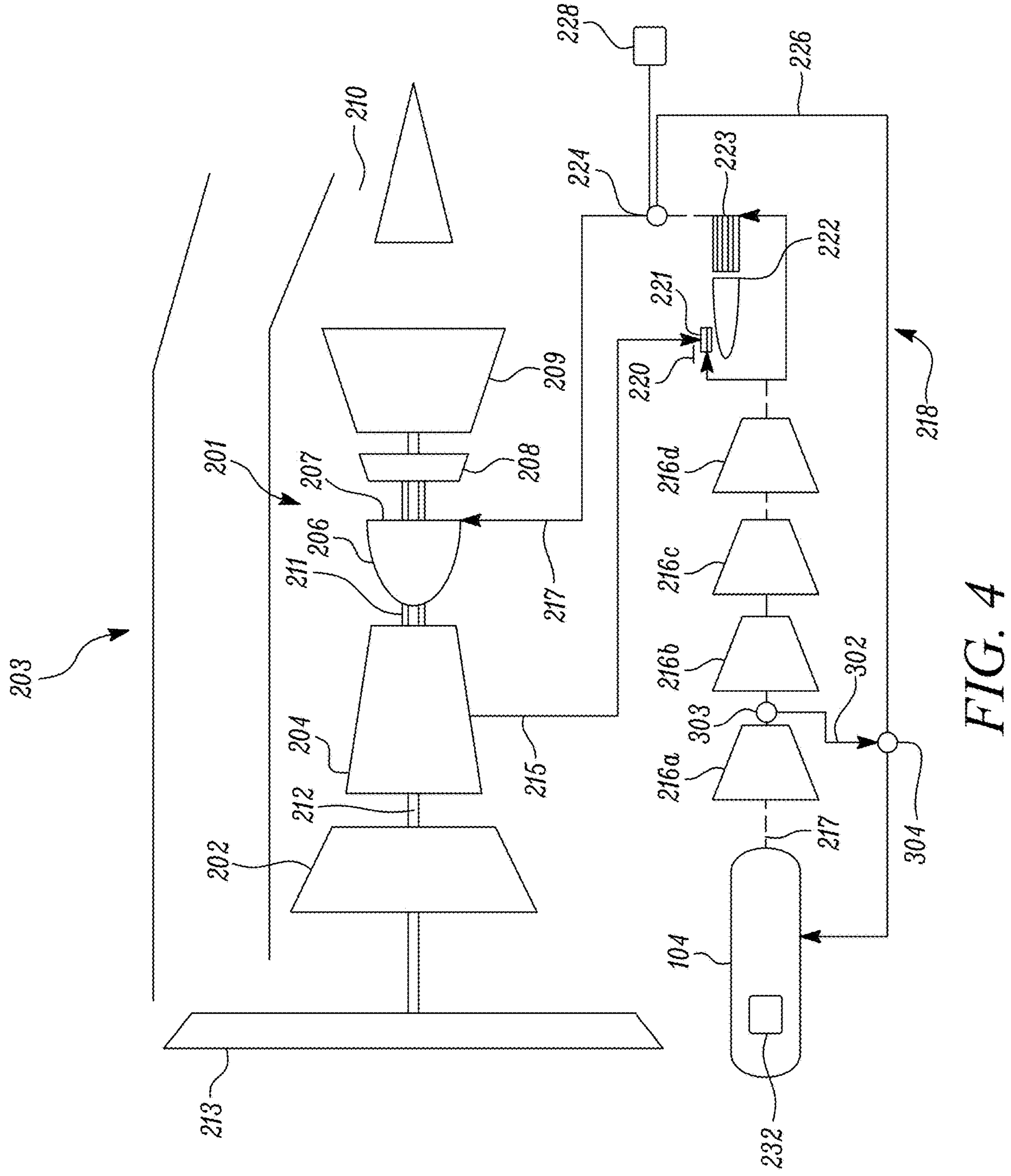
FIG. 4 is a block diagram of one of the engines of FIG. 1 including a second alternative fuel system.

FIG. 4 shows a second alternative fuel system for the engine 103. The system is similar to that shown in FIG. 3, but further additional features are provided.

In place of the single liquid hydrogen pump 216, a plurality of hydrogen pumps 216*a*, 216*b*, 216*c*, 216*d* are provided in series.

A first hydrogen pump 216*a* is provided downstream of the tank 104 is main hydrogen fuel conduit 217 flow, and will encounter the lowest inlet pressure of the pumps 216*a-d*. As such, this pump will be most susceptible to cavitation. Second, third and fourth pumps 216*b-d* are provided downstream in series.

The pump return line 302 is provided having an offtake point between an outlet of the first pump 216*a* and an inlet of the second pump 216*b*. Operation of the valve 303 thereby both controls flow to the mixer 304, and also relieves pressure downstream of the first pump 216*a* and upstream of the second pump 216*b*. As such, pressure head provided by the pumps 216*a*, 216*b* can be controlled, to provide improved operability and increased stall margin.

Although shown as being relatively close together in FIG. 4, the pumps 216*a-d* could be spaced significantly from each other. For example, the first pump 216*a* may be provided within the wing or fuselage of the aircraft, physically proximate the tank 104. The second, third and fourth pumps 216*b-d* may be provided within an engine nacelle, proximate the engine 103. As such, the return line 302 is provided on the aircraft within the fuselage or wing, thereby reducing the length of ducting required.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

Modifications could be made to the disclosed arrangement. For example, the hydrogen tank could be configured to store hydrogen in a compressed gaseous or supercritical state.

The invention claimed is:

1. A fuel system for a hydrogen fueled gas turbine engine comprising:

a tank configured to store hydrogen;

a plurality of pumps provided in series configured to provide pressurised hydrogen at an outlet thereof;

a pump return offtake configured to divert a portion of fuel from an outlet of the pump to the tank and wherein the pump return offtake is provided downstream of at least a first hydrogen pump outlet, and upstream of a further hydrogen pump inlet;

a pre-heater configured to heat at least a portion of pressurised hydrogen fuel downstream of the plurality of pumps; and a preheater return offtake configured to return at least a portion of hydrogen fuel heated by the preheater to the tank;

wherein the fuel system comprises a mixer configured to mix flow from the preheater return offtake and pump return offtake prior to return of the mixed flow to the tank.

2. A fuel system according to claim 1, wherein the hydrogen tank is configured to store cooled compressed hydrogen as a supercritical fluid at a pressure between 50 and 350 Bar.

3. A fuel system according to claim 1, wherein the hydrogen tank is configured to store liquid hydrogen.

4. A fuel system according to claim 3, wherein the hydrogen tank is configured to store liquid hydrogen at a pressure of between 1 and 4 Bar.

5. A fuel system according to claim 1, wherein the fuel system comprises a preheater return valve and a controller operable to control flow through the preheater return offtake to the tank.

6. A fuel system according to claim 5, wherein the controller is configured to maintain pressure within the tank above a saturation pressure.

7. A fuel system according to claim 5, wherein the fuel system comprises a pump return valve and the controller controls flow through the pump return offtake to the tank.

8. A fuel system according to claim 7, wherein the controller is configured to control a pressure head provided by the plurality of pumps.

9. A method according to claim 8, wherein the method comprises, by the controller, controlling a pump return valve configured to control flow through the pump return offtake to the tank, to control a pressure head provided by the plurality of pumps to improve operability and increase stall margin.

10. A fuel system according to claim 1, wherein the mixer comprises an ejector, wherein flow from the preheater return offtake is configured to drive flow from the pump return offtake.

11. A fuel system according to claim 1, wherein the preheater comprises a burner configured to burn a portion of hydrogen fuel to produce heated hydrogen fuel.

12. A method of delivering hydrogen fuel to the gas turbine engine using the fuel system according to claim 1, the method comprising:

pumping hydrogen fuel from the tank through a main fuel conduit;

heating hydrogen to provide a heated pressurised hydrogen gas; and returning a portion of the heated, pressurised hydrogen gas to the tank.

13. A method according to claim 12, wherein the method comprises, by a controller, controlling a preheater return valve configured to control flow through the preheater return offtake to the tank, to maintain pressure within the tank above a saturation pressure.

* * * * *